United States Patent Office 2,695,311
Patented Nov. 23, 1954

2,695,311

PREPARATION OF 2- AND 4-NITROBENZOIC ACID

William S. Emerson and Robert A. Heimsch, Dayton, Ohio, assignors to Monsanto Chemical Company, St. Louis, Mo., a corporation of Delaware No Drawing. Application August 23, 1952, Serial No. 306,073

3 Claims. (Cl. 260—523)

The present invention relates to the preparation of 2- or 4-nitrobenzoic acid and deals more specifically with the production of the substantially pure and substantially isomer-free acids from 2- or 4-nitroacetophenone.

The substantially pure 2- or 4-nitrobenzoic acids are valuable intermediates for the manufacture of pharmaceuticals, dyestuffs and monomeric polymerizable materials for the production of which the use of the substantially isomer-free nitrobenzoic acids is imperative. Preparation of the 2- or 4-nitrobenzoic acids by nitration of benzoic acid is inexpedient in that the nitration results in the predominant formation of the isomeric 3-nitrobenzoic acid.

An object of the invention is to produce the isomer-free 2- or 4-nitrobenzoic acid, in good yields and without tedious isolation steps from readily available raw materials. Another object of the invention is to convert 2- or 4-nitroacetophenone into 2- or 4-nitrobenzoic acid, respectively.

These and other objects hereinafter disclosed are provided by the following invention wherein the respective ketones are converted to 2- or 4-nitrobenzoic acids by treatment with nitric acid.

In converting 2- or 4-nitroacetophenone to 2- or 4-nitrobenzoic acids, we operate substantially as follows: The 2- or 4-nitroacetophenone is heated with nitric acid until conversion of the ketone to the respective 2- or 4-nitrobenzoic acid has been completed. Inasmuch as the oxidation is accompanied by liberation of nitrogen dioxide, initiation and cessation of the reaction may be ascertained by noting this phenomenon. Eight moles of nitric acid is required to convert one mole of the nitroacetophenone; however, although it is advantageous to employ the nitric acid in stoichiometric quantity, greater or lower proportions of the nitric acid may be used. In order to effect smooth reaction, it is desirable to operate in the presence of an inert diluent, such as water. Aqueous nitric acid is preferred as the oxidizing medium. The temperature at which the reaction is effected depends upon the concentration of the nitric acid and is generally between, say, 60° C. up to the refluxing temperature of the reaction mixture.

We have found that the oxidation is usually slow in getting started. In order to reduce this induction period, we prefer to operate in the presence of a small quantity, say, from 0.5 per cent to 2 per cent, based on the weight of the nitroacetophenone, of a reducible metal compound. As examples of compounds which may be employed to decrease the induction period may be mentioned ammonium metavanadate, potassium permanganate, ferric oxide, mercuric oxide, sodium dichromate, etc.

The two nitrobenzoic acids may be readily separated from the final reaction mixture by methods known to the art. Generally, the crude acid crystallizes upon cooling the reaction mixture and can be removed therefrom by filtration. The crude product may then be purified by recrystallization from such solvents as benzene, ethanol, benzene-ethanol mixtures, hexane, etc.

A preparation of the nitrobenzoic acids by the present process provides a final step in a series of reactions which makes possible conversion of ethylbenzene, a readily available raw material, into the isomer-free nitrobenzoic acids. Such a series of reactions includes reaction of ethylbenzene with nitric acid to give a mixture of 2- and 4-nitroethylbenzenes, separation of the two nitroethylbenzenes by fractional distillation, air-oxidation of the respective 2- and 4-nitroethylbenzenes as described by Emerson et al. (J. Am. Chem. Soc., 71, 1742 (1949) and 69, 706 (1947)) to yield 2- and 4-nitroacetophenone, respectively, and the step of the present invention, i. e., conversion of the respective nitroacetophenones to the 2- or 4-nitrobenzoic acids. While as shown in the application of William S. Emerson and Robert A. Heimsch, Serial No. 306,074, filed of even date, reaction of 2-nitroethylbenzene with nitric acid results in direct oxidation of the nitroethylbenzene to 2-nitrobenzoic acid, a better overall yield is obtained by employing a two-step conversion as permitted by the present invention. Thus, while oxidation of nitroethylbenzene with nitric acid gives a 45 per cent yield of 2-nitrobenzoic acid in the one-step process, an over-all yield of about 70 per cent, based on the nitroethylbenzene is obtained by primary oxidation of the nitroethylbenzene to the nitroacetophenone and subsequent oxidation of the ketone to the nitrobenzoic acid.

The invention is further illustrated, but not limited, by the following examples:

*Example 1*

A mixture consisting of 100 cc. of concentrated nitric acid ($d=1.42$), 100 cc. of water and 0.4 g. of ammonium metavanadate was heated to boiling and to the heated mixture there was added 41 g. (0.25 mole) of 2-nitroacetophenone during a time of 30 minutes. Evolution of nitrogen dioxide, which indicated initiation of the oxidation reaction, was noted after 10 minutes. Refluxing was continued for 6 hours. The resulting reaction mixture was then cooled, filtered, washed and dried. There was thus obtained 32.5 g. of the crude 2-nitrobenzoic acid. Crystallization of the crude product from a mixture of methyl ethyl ketone and benzene gave 17 g. of the substantially pure 2-nitrobenzoic acid, M. P. 146–149.3 C. An additional 13 g. of the substantially pure acid, M. P. 146.5–148° C. was obtained by concentrating the filtrate, adding hexane to it and cooling. Still another 4 g. of the substantially pure acid, M. P. 143–147° C. was obtained by evaporating the mother liquor under reduced pressure. The total quantity (34 g.) thus obtained, represented an 82 per cent theoretical yield.

*Example 2*

To a mixture consisting of 100 cc. concentrated nitric acid ($d=1.42$), 0.4 g. of ammonium metavanadate and 100 cc. of water, there was added 41 g. of 4-nitroacetophenone during a time of 40 minutes. The whole was then refluxed for 6 hours. The precipitate which was obtained upon filtering and cooling the resulting reaction mixture was washed with ether and dried to give 42.5 g. of crude 4-nitrobenzoic acid, which after crystallization from aqueous ethanol, gave 29.5 g. of the substantially pure 4-nitrobenzoic acid, M. P. 233–237° C. An additional 15.5 g. of the crude product was obtained from the filtrate by evaporation, cooling and filtration. This crude product (Crop 2) was recrystallized from ethanol to yield 4.5 g. of the substantially pure acid, M. P. 236–238° C. An additional 2.5 g. of the substantially pure product was obtained by evaporating the mother liquor and treating it with hexane. The total quantity (36.5 g.) thus obtained, represented an 88 per cent yield.

What we claim is:

1. The method which comprises refluxing a ketone selected from the class consisting of 2- and 4-nitroacetophenone with aqueous nitric acid in the presence of ammonium metavanadate and recovering from the resulting reaction product an acid selected from the class consisting of 2- and 4-nitrobenzoic acids.

2. The method which comprises refluxing 2-nitroacetophenone with aqueous nitric acid in the presence of ammonium metavanadate and recovering 2-nitrobenzoic acid from the resulting reaction product.

3. The method which comprises refluxing 4-nitroacetophenone with aqueous nitric acid in the presence of ammonium metavanadate and recovering 4-nitrobenzoic acid from the resulting reaction product.

(References on following page)

References Cited in the file of this patent

UNITED STATES PATENTS

| Number | Name | Date |
|---|---|---|
| 1,332,028 | Coblentz et al. | Feb. 24, 1920 |
| 1,488,730 | Beall et al. | Apr. 1, 1924 |

FOREIGN PATENTS

| Number | Country | Date |
|---|---|---|
| 494,439 | Belgium | Mar. 31, 1950 |
| 979,063 | France | Dec. 6, 1950 |
| 655,074 | Great Britain | July 11, 1951 |

OTHER REFERENCES

Buchka, Ber. Deut. Chem., vol. 10, p. 1714 (1877).

Engler, Beilstein (Handbuch, 4th Ed.), vol. 7, p. 288 (1925).